United States Patent
Tran (10) Patent No.: US 9,547,593 B2
(45) Date of Patent: Jan. 17, 2017

(54) SYSTEMS AND METHODS FOR RECONFIGURING CACHE MEMORY

(75) Inventor: Thang M. Tran, Austin, TX (US)

(73) Assignee: NXP USA, Inc., Austin, TX (US)

( * ) Notice: Subject to any disclaimer, the term of this patent is extended or adjusted under 35 U.S.C. 154(b) by 1262 days.

(21) Appl. No.: 13/036,321

(22) Filed: Feb. 28, 2011

(65) Prior Publication Data

US 2012/0221793 A1    Aug. 30, 2012

(51) Int. Cl.
G06F 12/08    (2016.01)
G06F 9/38    (2006.01)

(52) U.S. Cl.
CPC ......... G06F 12/0811 (2013.01); G06F 9/3851 (2013.01); G06F 12/0842 (2013.01); G06F 2212/601 (2013.01); Y02B 60/1225 (2013.01)

(58) Field of Classification Search
CPC . G06F 12/0842; G06F 12/0853; G06F 9/3851
USPC ....................................................... 711/124
See application file for complete search history.

(56) References Cited

U.S. PATENT DOCUMENTS

| | | | |
|---|---|---|---|
| 5,502,683 A | 3/1996 | Marchioro | |
| 6,272,616 B1 | 8/2001 | Fernando et al. | |
| 6,304,954 B1 | 10/2001 | Munson | |
| 6,341,347 B1 | 1/2002 | Joy et al. | |
| 7,257,814 B1 | 8/2007 | Melvin et al. | |
| 7,305,523 B2 * | 12/2007 | Guthrie et al. | 711/124 |
| 7,353,364 B1 | 4/2008 | Chong et al. | |
| 2003/0191927 A1 * | 10/2003 | Joy et al. | 712/228 |
| 2005/0071535 A1 * | 3/2005 | Luick | 711/3 |
| 2006/0184741 A1 * | 8/2006 | Hrusecky et al. | 711/130 |
| 2006/0184742 A1 * | 8/2006 | Clark et al. | 711/133 |
| 2006/0265576 A1 | 11/2006 | Davis et al. | |
| 2007/0143581 A1 * | 6/2007 | Mansell | 712/225 |
| 2007/0204137 A1 * | 8/2007 | Tran | 712/214 |
| 2008/0091880 A1 * | 4/2008 | Vishin | 711/122 |
| 2008/0229058 A1 * | 9/2008 | Le et al. | 712/13 |
| 2012/0246448 A1 | 9/2012 | Abdallah | |
| 2013/0212585 A1 | 8/2013 | Tran | |

OTHER PUBLICATIONS

Changkyu Kim et al. "Composable Lightweight Processors." Dec. 2007. IEEE. MICRO 2007. pp. 381-393.*
Norman P. Jouppi. "Cache Write Policies and Performance." 1993. ACM. ISCA '93. pp. 191-201.*
Se-Hyun Yang et al. "Exploiting Choice in Resizable Cache Design to Optimize Deep-Submicron Processor Energy-Delay." Feb. 2002. IEEE. HPCA 2002. pp. 151-161.*
John L. Hennessy and David A. Patterson. Computer Architecture: A Quantitative Approach. 2007. Elsevier. 4$^{th}$ ed. pp. 288-293, 315-324, C-29-C-34.*
Sarah Leilani Harris. "Synergistic Caching in Single-Chip Multiprocessors." Mar. 2005. Stanford University. pp. 8-47.*

(Continued)

Primary Examiner — Nathan Sadler (57) ABSTRACT

A microprocessor system is disclosed that includes a first data cache that is shared by a first group of one or more program threads in a multi-thread mode and used by one program thread in a single-thread mode. A second data cache is shared by a second group of one or more program threads in the multi-thread mode and is used as a victim cache for the first data cache in the single-thread mode.

19 Claims, 8 Drawing Sheets

(56) References Cited

OTHER PUBLICATIONS

Rajeev Garg et al. "Cache Design Options for a Clustered Multithreaded Architecture." Oct. 2005. University of Rochester, Computer Science Department. TR# 866.*
Frank P. O'Connell and Steven W. White. "POWER3: The next generation of PowerPC processors." Nov. 2000. IBM. IBM Journal of Research and Development. vol. 44. pp. 873-884.*
Norman P. Jouppi. "Improving direct-mapped cache performance by the addition of a small fully-associative cache and prefetch buffers." May 1990. ACM. ISCA 17. pp. 364-373.*
IEEE. IEEE 100: The Authoritative Dictionary of IEEE Standards Terms. Dec. 2000. $7^{th}$ ed. p. 685.*
Jude A. Rivers et al. "On High-Bandwidth Data Cache Design for Multi-Issue Processors." Dec. 1997. IEEE. MICRO '97. pp. 46-56.
Kenneth M. Wilson and Kunle Olukotun. "Designing High Bandwidth On-Chip Caches." Jun. 1997. ACM. ISCA '97. pp. 121-132.
Muhamed F. Mudawar. "Scalable Cache Memory Design for Large-Scale SMT Architectures." Jun. 2004. ACM. WMPI '04. pp. 65-71.
Rakesh Kumar et al. "Conjoined-core Chip Multiprocessing." Dec. 2004. IEEE. MICRO-37 2004.
U.S. Appl. No. 13/037,013, Tran, T.M., "Systems and Methods for Configuring Load-Store Execution Units", Office Action—Final Rejection, mailed Jul. 9, 2013.
U.S. Appl. No. 13/037,013, Tran, T.M., "Systems and Methods for Configuring Load-Store Execution Units", Office Action—Allowance, mailed Sep. 20, 2013.
Bruce Shriver and Bennett Smith. "The Anatomy of a High-Performance Microprocessor: A Systems Perspective" 1998, IEEE, pp. 77-83.

* cited by examiner

SYSTEMS AND METHODS FOR RECONFIGURING CACHE MEMORY

BACKGROUND

Field

This disclosure relates generally to cache memory, and more specifically, to victim cache.

Related Art

Various processor designers have attempted to increase on-chip parallelism through superscalar techniques, which are directed to increasing instruction level parallelism (ILP), and multi-threading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. A typical multi-threading operating system (OS) allows multiple processes and threads of the processes to utilize a processor one at a time, usually providing exclusive ownership of the processor to a particular thread for a time slice. In many cases, a process executing on a processor may stall for a number of cycles while waiting for some external resource (for example, a load from a random access memory (RAM)), thus lowering efficiency of the processor. Simultaneous multi-threading (SMT) allows multiple threads to execute different instructions from different processes in the same processor, using functional units that another executing thread or threads left unused.

In order to improve memory performance of processing systems, complex memory structures which seek to exploit the individual advantages of different types of memory have been developed. In particular, it has become common to use fast cache memory in association with larger, slower and cheaper main memory.

For example, the memory in a computer system can be organized in a memory hierarchy comprising memory of typically different size and speed. Thus a computer system may typically comprise a large, low cost but slow main memory and in addition have one or more cache memory levels comprising relatively small and expensive but fast memory. During operation data from the main memory is dynamically copied into the cache memory to allow fast read cycles. Similarly, data may be written to the cache memory rather than the main memory thereby allowing for fast write cycles.

A memory operation where the processor can receive the data from the cache memory is typically referred to as a cache hit and a memory operation where the processor cannot receive the data from the cache memory is typically referred to as a cache miss. Typically, a cache miss does not only result in the processor retrieving data from the main memory but also results in a number of data transfers between the main memory and the cache. For example, if a given address is accessed resulting in a cache miss, the subsequent memory locations may be transferred to the cache memory. As processors frequently access consecutive memory locations, the probability of the cache memory comprising the desired data thereby typically increases.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein are capable of operating in single and multi-threaded modes. In multi-threaded mode, two independent data caches are used to help enable the threads to be executed at least as fast as they would execute on separate processors. In single-thread mode, the second data cache is reconfigured as a victim cache for the first data cache, effectively doubling the size of the Level 1 (L1) data cache available to the single program thread. The increased L1 data cache boosts the performance of the processor in single-thread mode compared to configurations with smaller data cache. The second data cache can be reconfigured as a victim cache and used in both write-through and copy-back modes.

Figure 1:
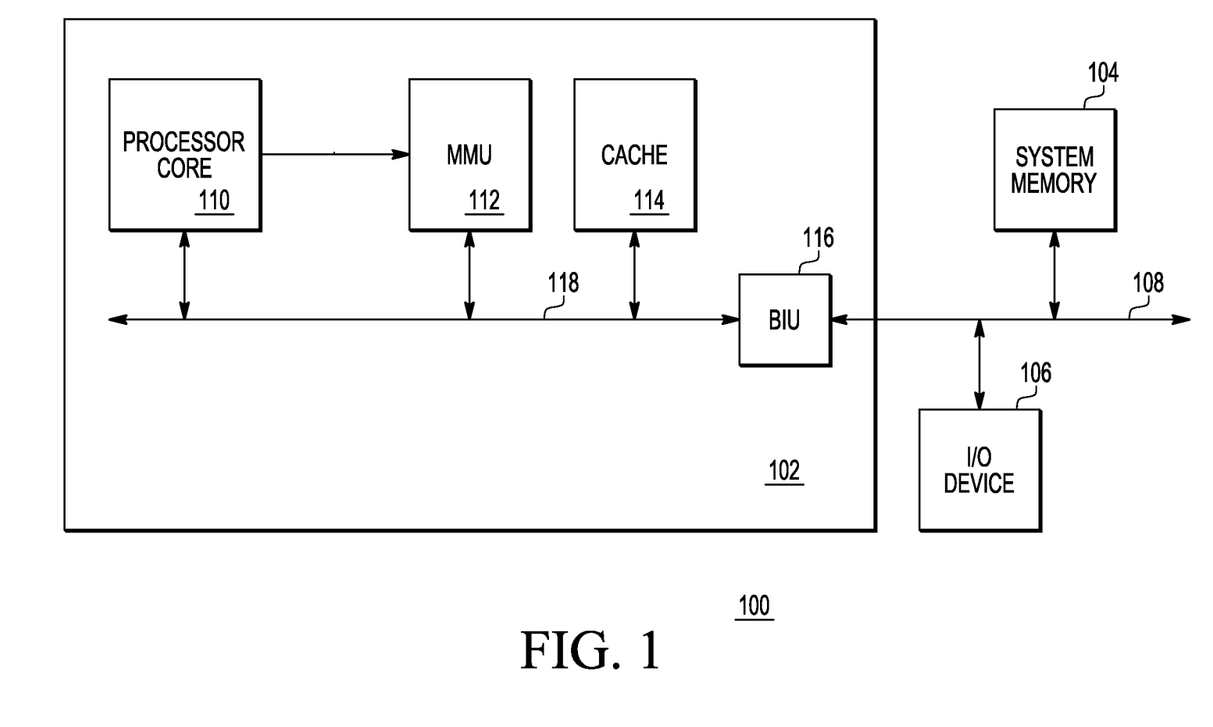
FIG. 1 illustrates a data processing system 100 that can be configured to utilize multiple data cache units during multi-thread mode and to reconfigure one of the data cache units as victim cache during a single-thread processing mode in accordance with at least one embodiment of the present disclosure.

FIG. 1 illustrates a data processing system 100 that can be configured to utilize multiple data cache units during multi-thread mode and to reconfigure one of the data cache units as victim cache during a single-thread processing mode in accordance with some embodiments of the present disclosure. In the depicted example, data processing system 100 includes processing device 102, system memory device 104 (e.g., random access memory (RAM)), and one or more input/output devices 106 connected via bus 108. Processing device 102 includes processor core 110, memory management unit (MMU) 112, cache memory 114, and bus interface unit (BIU) 116 interconnected via bus 118, whereby BIU 116 serves as an interface between bus 118 and bus 108.

In operation, processing device 102 executes instructions using processor core 110, whereby instruction data and operand data can be accessed from cache 114, system memory device 104, I/O device 106, or another source. Data resulting from the execution of the instructions can be provided for storage in system memory device 104 or provided to I/O device 106 via BIU 116. In order to expedite memory accesses to devices external to processing device 102 (e.g., system memory device 104 and I/O device 106), cache 114 can be used to cache instruction data and related data.

MMU 112 controls accesses to cache 114 and memory accesses to devices external to processing device 102, including system memory device 104 and I/O device 106. MMU 112 can map the system memory device 104 and the bus interface of the I/O device 106 to corresponding memory addresses (e.g., virtual memory addresses) so that all accesses to the external devices are treated as a memory access.

Figure 2:
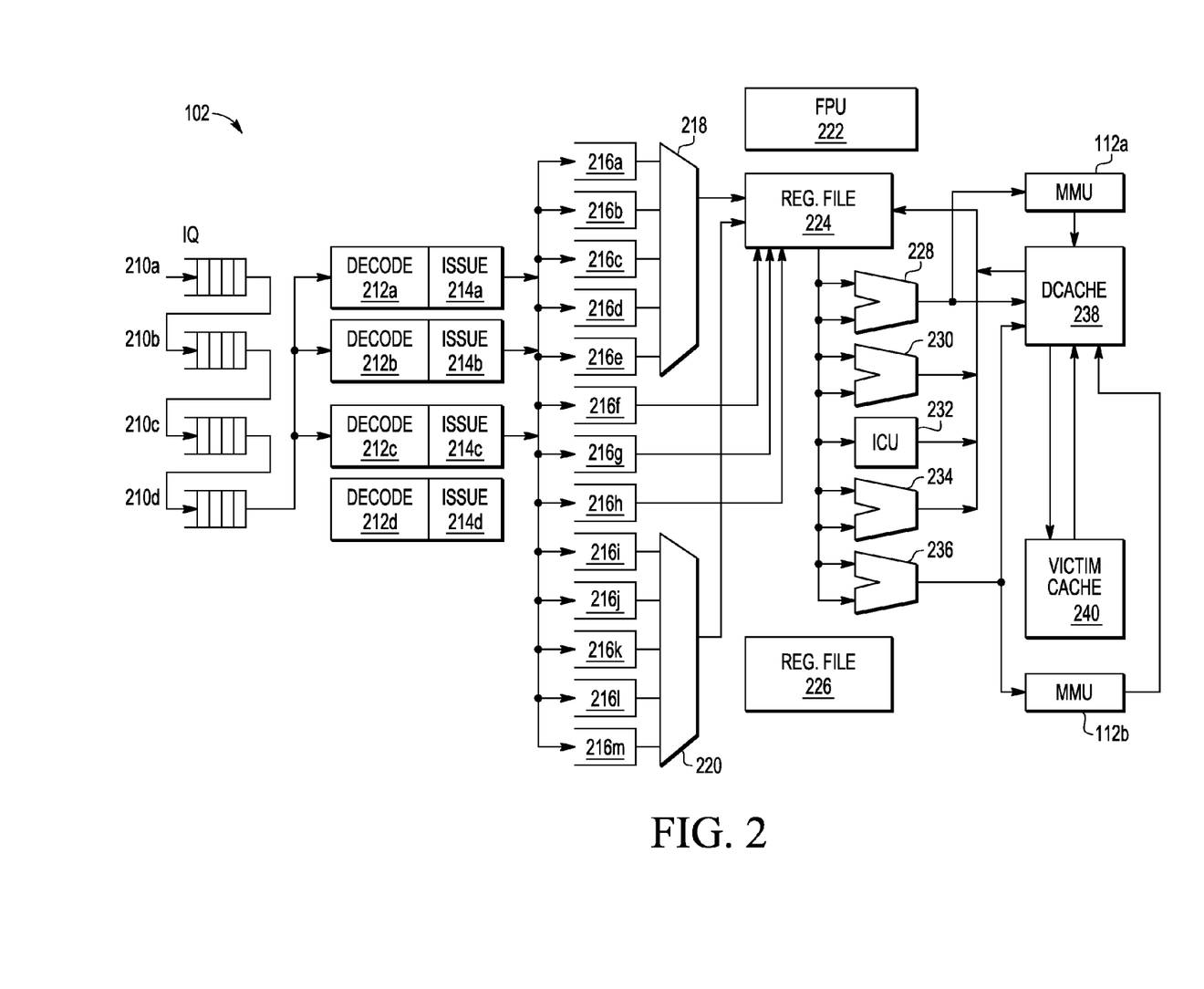
FIG. 2 is a diagram of an embodiment of components in the computer processor of FIG. 1 in single thread mode.

Referring to FIG. 2, a diagram of an embodiment components in processor 102 of FIG. 1 including instruction queues 210a-210d (collectively 210), instruction decoder units 212a-212d (collectively 212), instruction issue units 214a-214d (collectively 214), execution queues 216a-216m (collectively 216), queue arbiters 218, 220, floating point execution unit 222, register files 224, 226, instruction execution units 228, 230, 232, 234, 236, first L1 data cache 238, and second L1 data cache configured as victim cache 240 for first data cache 238 during single thread mode. Processor 102 can further include two MMUs 112. A first MMU 112a can be coupled to receive input from load/store execution unit 228 and provide output to first L1 data cache 238. A second MMU 112b can be coupled to receive input from load/store execution unit 236 and provide output to first L1 data cache 238. In single thread mode, MMUs 112 hold identical data too allow load/store execution units 228, 236 to effectively serve as a single dual port load/store execution unit.

Victim cache 240 stores data evicted from first data cache 238 when the data in first data cache 238 is replaced. In a multi-thread mode, MMUs 112 are configured to access first L1 data cache 238 for one or more program threads and second L1 data cache 240 for one or more other program threads. In single-thread mode, MMUs 112 are configured to access L1 data cache 238 and second L1 data cache 240 as a victim cache of the first L1 data cache. Victim cache 240 is intended to reduce the number of cache misses with first data cache 238 thereby reducing the number of accesses to more power consuming structures such as Level 2 (L2) cache and also reducing execution time of the program threads by effectively increasing (e.g., doubling) the amount of L1 cache available to the single thread.

Instruction units 210 implement instruction queues configured to provide program instructions to respective decoder units 212. Decoder units 212 can include logic to multiplex valid instructions, decode instructions for instruction type, source, and destination operands, generate queue entries and tags for instructions, rename instruction operands to a latest register mapping, forward renamed registers from a next stage, determine source and destination register dependencies between instructions, check dependency with previous instructions in execution queues, and separate complex instructions into micro-instructions.

A serialize instruction can issue for instruction exceptions (e.g., Translation Look-aside Buffer miss, breakpoint, and illegal instruction), software interrupts (SWI), and instructions that modify processor configuration and states.

Instruction issue units 214 can issue instructions to execution queues 216, and update register renaming for issued instructions. While some of the resources are shared between threads in multi-thread mode, a single thread can use all of the resources as required including all of execution queues 216 and execution units 228-236 in single thread mode. Note that execution queues 216 can include various types of execution queues including multiple load/store queues, an integer queue, a branch queue, and one or more complex integer queues.

Processor 102 can further schedule execution of instructions using arbiters 218, 220, which arbitrate the sequence load/store, branch, integer, and complex integer instructions issued to corresponding execution units 228-236.

In single thread mode, three instructions can be sent to separate decoder units 212a, 212b, 212c resulting in execution of three instructions per cycle. A fourth instruction can be sent to decoder unit 212d resulting in execution of four instructions per cycle. In multi-thread mode, two threads can concurrently send two instructions each to decoder units 212a-212b and 212c-212d resulting in execution of two instructions per cycle per thread. When switching to single-thread mode, data cache 240 will be initialized as victim cache 240 for data cache 238.

Figure 3:
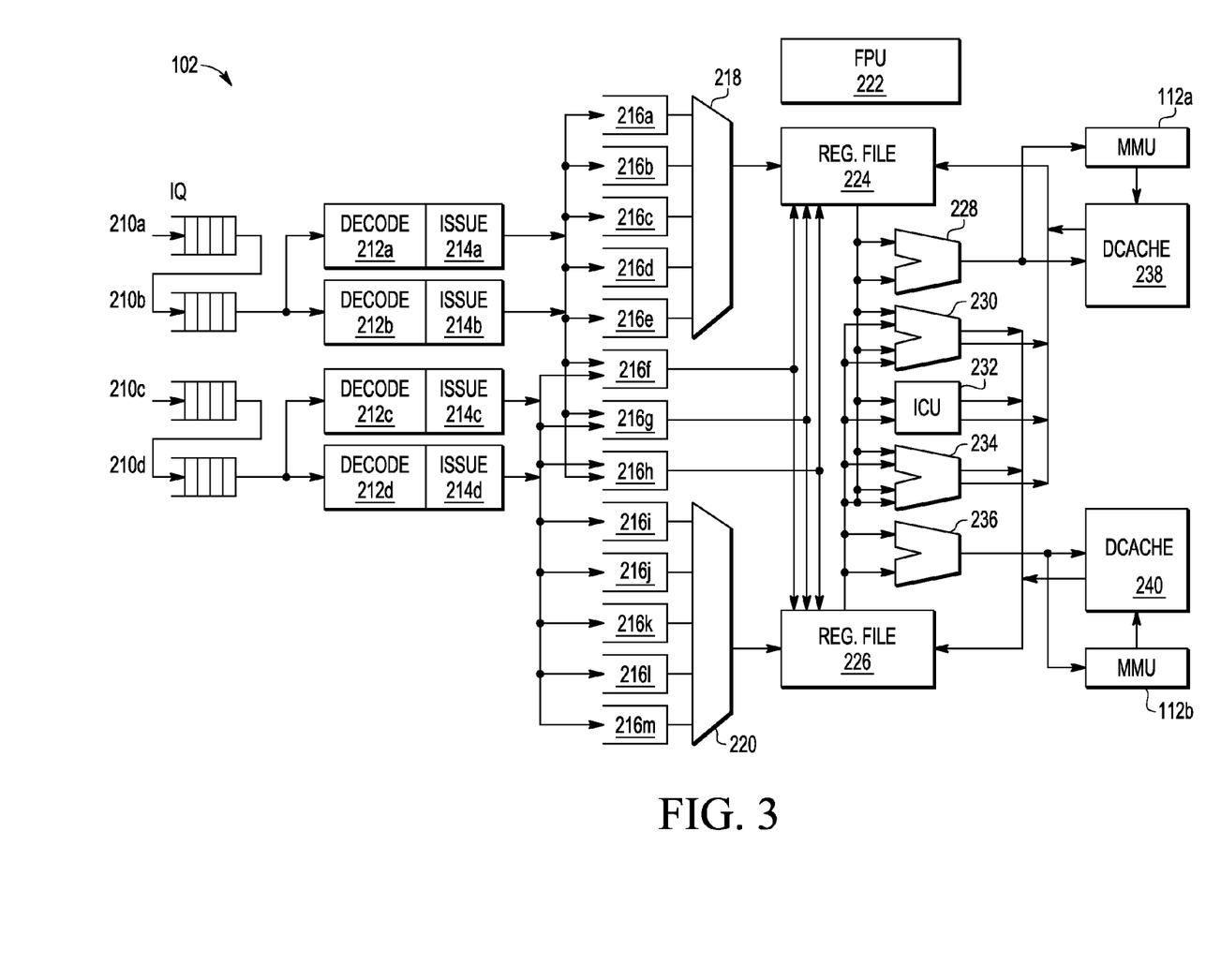
FIG. 3 is a diagram of an embodiment of components in the computer processor of FIG. 1 in dual thread mode.

FIG. 3 is a diagram of an embodiment of components in computer processor 102 of FIG. 1 that can be used in dual thread mode wherein cache 240 is configured as a L1 data cache instead of a victim cache for data cache 238. In some embodiments, components in processor 102 can be divided equally between the first and second threads so that each thread has the performance of a single thread with the same issue width, which refers to the number of instructions that can be executed per clock cycle. For example, a first thread can use instruction queues 210a, 210b, decoder units 212a, 212b, instruction issue units 214a, 214b, execution queues 216a-216e, arbiters 218, register file 224, branch execution unit (not shown), load/store execution unit 228, MMU 112a, and data cache 238. A second thread can use instruction queues 210c, 210d, decoder units 212c, 212d, instruction issue units 214a, 214b, execution queues 216i-216m, arbiters 220, register file 226, branch execution unit (not shown), load/store execution unit 236, MMU 112b, and data cache 240. Other execution queues 216f-216h, floating point unit 222, integer complex execution unit 232, and integer execution units 230, 234 can be shared between the two threads.

Figure 4:
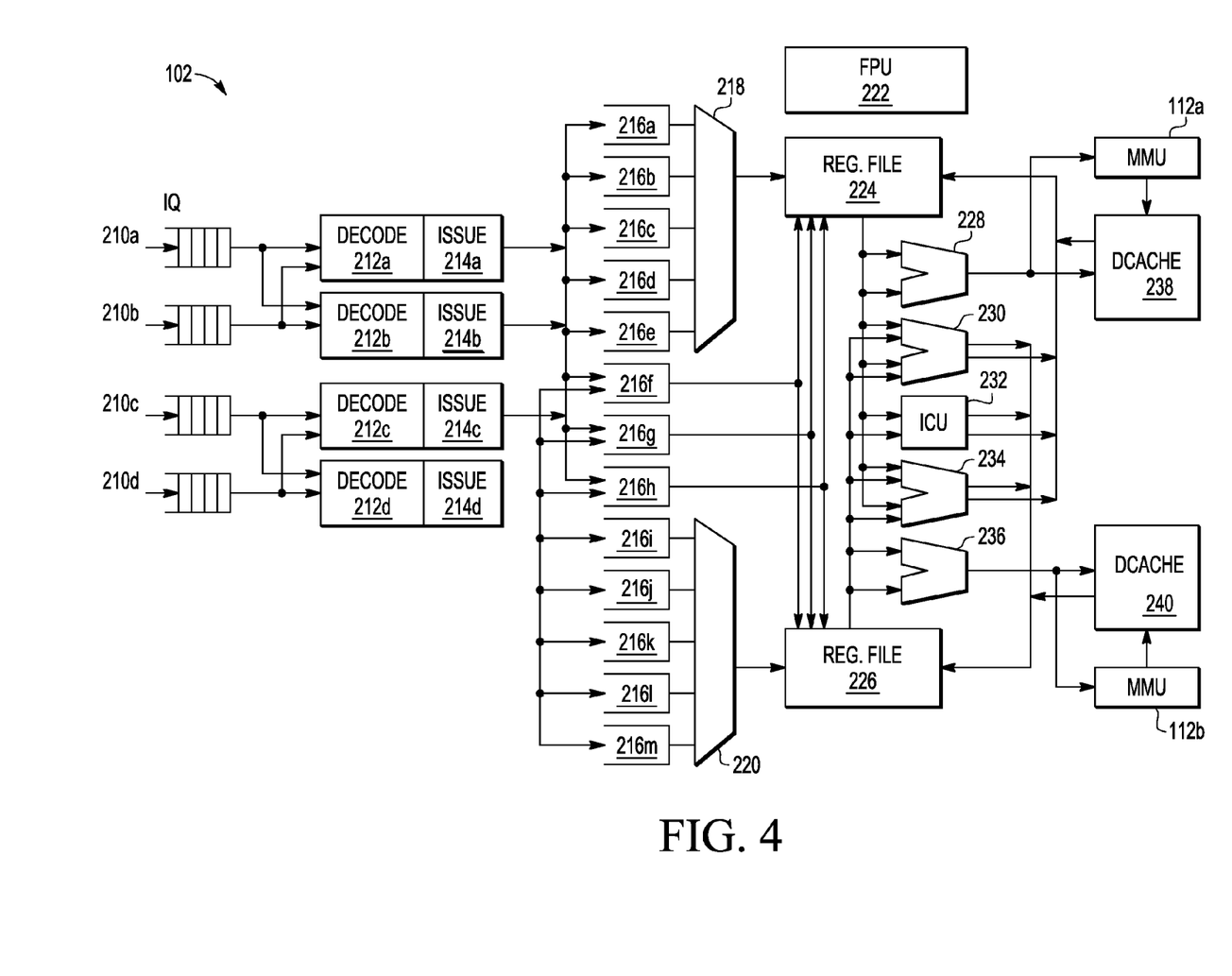
FIG. 4 is a diagram of an embodiment of components in the computer processor of FIG. 1 in quad thread mode.

FIG. 4 is a diagram of an embodiment of components in computer processor 102 of FIG. 1 configured for quad thread mode wherein cache 240 is configured as a L1 data cache for thread one and three instead of a victim cache for data cache 238. One multi-threading technique that can be used in quad-thread mode is simultaneous threading (SMT) wherein instructions from more than one thread can be executed in any given pipeline stage at a time for 4 threads. In some embodiments, components can be divided equally between the first two threads and the second two threads. For example, threads zero and two can use instruction queues 210a, 210b, decoder units 212a, 212b, instruction issue units 214a, 214b, execution queues 216a-216e, arbiters 218, register file 224, load/store execution unit 228, branch execution unit (not shown), and data cache 238. Threads one and three can use instruction queues 210c, 210d, decoder units 212c, 212d, instruction issue units 214a, 214b, execution queues 216i-216m, arbiters 220, register file 226, load/store execution unit 236, branch execution unit (not shown), and data cache 240. Integer execution queues 216f-216h, floating point unit 222, integer complex execution unit 232, and integer execution units 230, 234 can be shared between the threads.

In some embodiments of methods disclosed herein, when a computer system executing multiple program threads in a processing unit, a first L1 data cache is accessed for a first thread, and a second L1 data cache is accessed for a second thread. When the computer system is executing a single program thread in the processing unit, the second L1 data cache can be accessed as a victim cache for the first L1 data cache. The first L1 data cache and the victim cache can both be accessed for the single program thread.

Note that cache memory systems are typically divided into cache lines which correspond to the resolution of a cache memory. In cache systems known as set-associative cache systems, a number of cache lines are grouped together in different sets wherein each set corresponds to a fixed mapping to the lower data bits of the main memory addresses. The extreme case of all cache lines forming a single set is known as a direct mapped cache and results in each main memory address being mapped to one specific cache line. The other extreme where each cache line is a set is known as a fully associative cache and this allows each cache line to be mapped to any main memory location. To improve the hit rate of a cache N-way caches are used in which instructions and/or data is stored in one of N storage blocks (i.e. 'ways').

Referring now to FIGS. 5-8, FIG. 5 is a flow diagram of a process 500 for using a second L1 data cache as a write through victim cache for a first L1 data cache in single thread mode in accordance with an embodiment of the present disclosure. Since all data in L1 cache and victim cache are in L2 cache, one general concept of the present disclosure is to move data (e.g., a whole cache line) from L2 cache to L1 and victim cache without the need to move data between L1 cache and victim cache. Process 500 can be implemented in cache 114 (FIG. 1) or other suitable component of processor 102.

The terms "requested data" or "requested cache line" are used in relation to execution of the load instruction. The term "evicted cache line" refers to the cache line in L1 cache that will be replaced by a "requested cache line."

Figure 5:
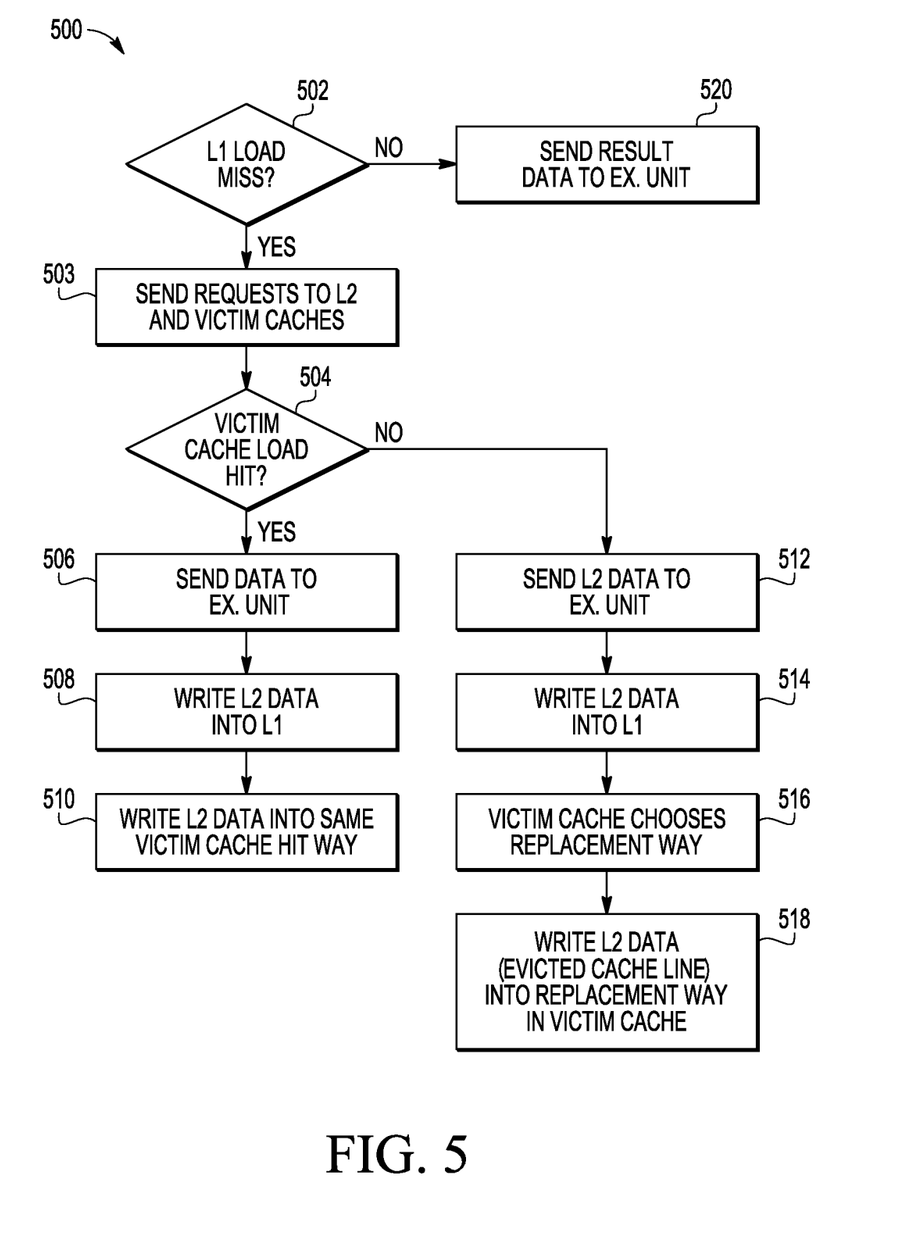
FIG. 5 is a flow diagram of a process for using a second Level 1 (L1) data cache as a write through victim cache for a first L1 data cache in single thread mode in accordance with an embodiment of the present disclosure.

Process 502 includes determining if a cache load miss occurred in the first L1 data cache for requested data. If a L1 cache load hit occurs, the data is sent from L1 cache to an execution unit in process 520. If the cache load miss occurred in the first L1 data cache, then process 503 includes sending two requests, one for the requested data and another for the cache line evicted from the L1 cache. The victim cache can receive evicted cache lines from the L2 cache.

Process 504 includes determining if a victim cache load hit occurred for the requested data. If the victim cache load hit occurred, process 506 includes sending the requested data to an execution unit from the victim cache. Process 508 includes writing the requested cache line data from a L2 cache into the first L1 data cache. Process 510 includes writing the evicted cache line from the L2 cache into the same hit way in the victim cache. Processes 508 and 510 effectively swap the evicted cache line from L1 data cache with the cache hit line from the victim cache. Note that if there is no evicted cache line from L1 cache, then process 510 results in cache line invalidation in the victim cache.

In another embodiment of process 508, the victim cache can send a requested cache line to L1 data cache instead of sending the data from the L2 cache.

Returning to process 504, if a cache load miss occurs in process 502, process 504 includes determining whether a victim cache load hit occurred for the selected data. If a victim cache load hit did not occur, process 512 includes sending the requested data to an execution unit from a L2 cache. Process 514 includes writing the requested cache line data from the L2 cache into the first L1 data cache. Process 516 includes choosing a replacement way in the victim cache. Process 518 includes writing the evicted cache line from the L2 cache into the chosen replacement way in the victim cache. Note that if there is no evicted cache line from L1 cache, then processes 514 and 516 are not executed.

Figure 6:
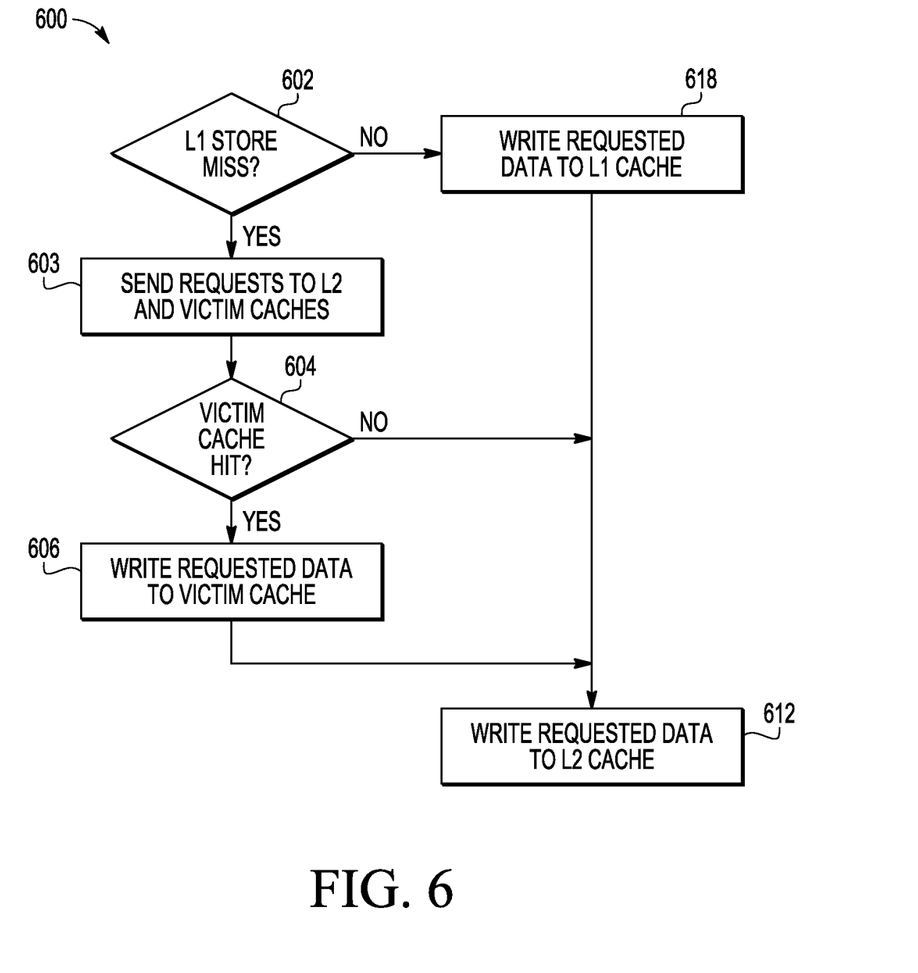
FIG. 6 is a flow diagram of a process for using a second L1 data cache as a write through victim cache for a first L1 data cache in single thread mode in accordance with another embodiment of the present disclosure.

FIG. 6 is a flow diagram of a process 600 for using a second L1 data cache as a write through victim cache for a first L1 data cache in single thread mode in accordance with another embodiment of the present disclosure. Process 600 can be implemented in cache 114 (FIG. 1) or other suitable component of processor 102.

Process 602 includes determining whether a cache store miss for requested data occurred in the first L1 data cache. If so, process 603 includes sending the store request to a L2 cache and the victim cache.

Process 604 includes determining whether a victim cache store hit occurred for the requested data. In response to determining the victim cache store hit occurred, process 606 includes writing the requested data to victim cache. Process 612 writes the requested data to L2 cache.

Returning to process 604, if a victim cache store miss occurred, process 612 writes the requested data to L2 cache.

Returning to process 602, if a store hit occurs in L1 cache, process 618 writes the requested data into L1 cache. Process 612 writes the requested data to L2 cache.

Process 600 is referred to as "write-through with no allocate." A miss in L1 or victim cache will not allocate a cache line.

In another embodiment, for "write-through with allocate", a cache line in L1 cache can be selected for writing the requested cache line from L2 cache to L1 cache. If there is an evicted cache line from L1, then a second request is sent to L2 cache. The evicted cache line will be written from L2 cache to victim cache.

Figure 7:
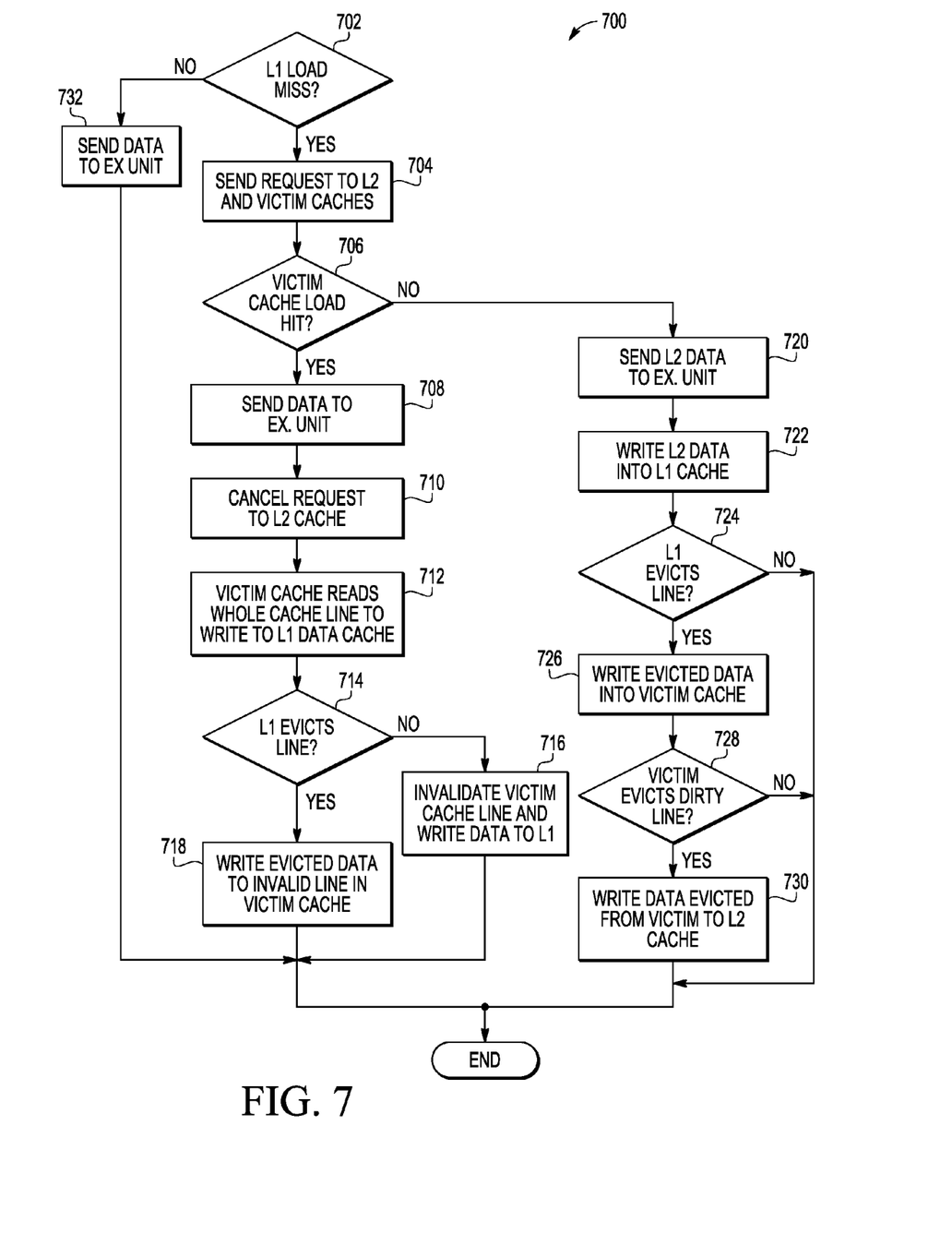
FIG. 7 is a flow diagram of a process for using a second L1 data cache as a copy back victim cache for a first L1 data cache in single thread mode in accordance with another embodiment of the present disclosure.

FIG. 7 is a flow diagram of a process 700 for using a second L1 data cache as a copy back victim cache for a first L1 data cache in single thread mode in accordance with another embodiment of the present disclosure. Process 700 can be implemented in cache 114 (FIG. 1) or other suitable component of processor 102. If a L1 cache load hit occurs, the data is sent from L1 cache to execution unit in process 732.

Process 702 includes determining whether a cache load miss occurred for requested data in the first L1 data cache. If so, process 704 includes sending the load request to a L2 data cache and the victim cache.

If the cache load miss was detected in process 702, process 706 includes determining whether a victim cache hit occurred for the requested data. If a victim cache hit occurred for the requested data, process 708 includes sending the requested data to an execution unit from the victim cache. Process 710 includes cancelling the load request to the L2 cache. Process 712 includes reading a cache line that includes the requested data from the victim cache, and writing the requested data to the L1 cache from the victim cache. Process 714 includes determining if the L1 data cache evicts a cache line when the data is written into the L1 data cache. If a cache line is not evicted from the L1 data cache, process 716 includes invalidating the cache line that includes the requested data in the victim cache. If a cache line is evicted from the L1 data cache, process 718 includes writing the cache line evicted from the L1 data cache into the selected cache line requested in the victim cache.

Processes 712-718 basically swap cache lines in L1 and victim caches. Since copy back cache can have dirty cache lines, swapping the cache lines is handled directly between L1 and victim cache. For write through cache, the data in victim cache and L1 cache are inclusive with data in L2 cache. Swapping the cache lines in write-through mode can be accomplished by reading data from L2 cache. Swapping cache lines can be done using the same technique as for copy back cache, as described by processes 712-718.

Returning to process 706, in response to determining that a victim cache load hit did not occur for the requested data, process 720 includes sending the requested data to an execution unit from a L2 cache. Process 722 includes writing the requested data from the L2 cache into the first L1 data cache.

In process 724, if the L1 data cache evicts a cache line when the data is written into the L1 data cache, then process 726 includes writing the cache line evicted from the L1 data cache into the victim cache.

If the victim cache evicts a dirty cache line when the data is written from the L1 data cache into the victim cache in process 728, then process 730 includes writing the cache line evicted from the victim cache to the L2 cache.

Figure 8:
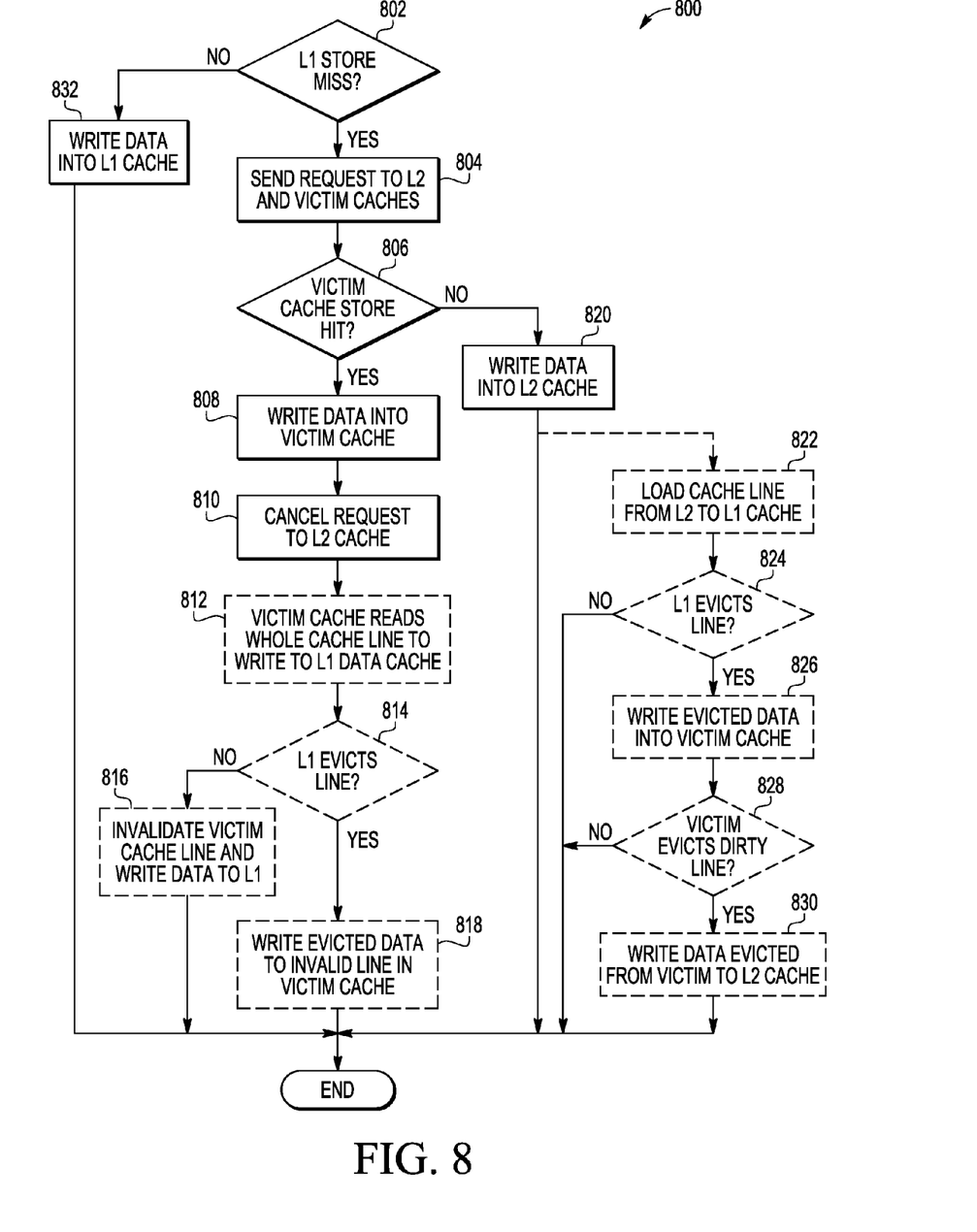
FIG. 8 is a flow diagram of a process for using a second L1 data cache as a copy back victim cache for a first L1 data cache in single thread mode in accordance with another embodiment of the present disclosure.

FIG. 8 is a flow diagram of a process 800 for using a second L1 data cache as a copy back victim cache for a first L1 data cache in single thread mode in accordance with another embodiment of the present disclosure. Process 800 can be implemented in cache 114 (FIG. 1) or other suitable component of processor 102.

Process 802 includes determining whether a cache store miss occurred for requested data in the first L1 data cache. If a L1 cache store hit occurs, then store data is written into L1 cache in process 832. If a cache store miss occurs, process 804 includes sending the store request to a L2 data cache and the victim cache.

Upon determining that a victim cache store hit occurred for the requested data in process 806, process 808 includes writing the requested data into the victim cache, and process 810 includes cancelling a request to write the requested data to the L2 cache.

Returning to process 806, upon determining a victim cache store hit did not occur for the requested data, process 820 includes writing the requested data into L2 cache (820).

Processes 802-810 and 820 are referred to as "write with no allocate."

In some embodiments, for "write with allocate," process 812 includes the victim cache reading a cache line that includes the requested data and writing the cache line to L1 data cache. Process 814 includes determining if the L1 data cache evicts a cache line when the data is written into the L1 data cache. If a cache line is not evicted from the L1 data cache, process 816 includes invalidating the cache line that includes the requested data in the victim cache. If a cache line is evicted from the L1 data cache, process 818 includes writing the cache line evicted from the L1 data cache into the selected cache line requested in the victim cache.

Process 822 includes writing the requested cache line including the requested data from a L2 cache to the L1 data cache. If the L1 data cache evicts a cache line when the requested cache line is written into the L1 data cache in process 824, process 826 includes writing the evicted cache line from the L1 data cache into the victim cache.

If the victim cache evicts a dirty cache line when the evicted cache line is written from the L1 data cache into the victim cache in process 828, then process 830 includes writing the cache line evicted from the victim cache to the L2 cache.

In other embodiments, the victim cache can be powered-off to conserve power until a predetermined threshold for cache line eviction is met, i.e., a greater number of cache lines being evicted above the threshold. The victim cache can then be powered up to effectively expand the amount of L1 cache available. L1 and L2 cache can operate as they would without victim cache until victim cache is online.

In some embodiments in a computer system executing multiple program threads in a processing unit, a method includes accessing a first Level 1 (L1) data cache for a first subset of the threads, and accessing a second L1 data cache for a second subset of the threads. In the computer system executing a single program thread in the processing unit, the method further includes configuring the second L1 data cache as a victim cache for the first L1 data cache; and accessing the first L1 data cache and the victim cache for the single program thread.

In further embodiments, the first L1 data cache is a write-through cache, the method can further include evicting a cache line from the first L1 cache to the victim cache by fetching a cache line with requested data from a Level 2 (L2) cache to the victim cache.

In further embodiments, the first L1 data cache is a write-through cache, the method can further include moving a cache line from the victim cache to the L1 cache by fetching a cache line with requested data from a L2 cache to the victim cache.

In further embodiments, the method can further include writing the requested data into only the victim cache in response to determining that a cache store miss for requested data occurred in the first L1 data cache.

In further embodiments, the method can further include writing the requested data into a L2 cache only in response to determining that a cache store miss for requested data occurred in the first L1 data cache and the victim cache.

In further embodiments, the method can further include writing a cache line with the requested data from the victim cache to the L1 cache; and if the L1 cache evicts a cache line, writing the cache line evicted from the L1 cache to the victim cache.

In further embodiments, the method can further include writing requested data from a L2 cache to the L1 cache; evicting a cache line from the L1 cache to the victim cache; and if a dirty cache line is evicted from the victim cache, swapping the dirty cache line for the requested data between the victim cache and the L2 cache.

In further embodiments, the method can further include, upon determining that a cache store miss for requested data occurred in the first L1 data cache, performing at least one of the group consisting of: writing the requested data into the L1 data cache and a L2 cache, and writing the requested data into the victim cache and the L2 cache.

In another embodiments, a processing system includes a first L1 data cache; a second L1 data cache; a first load/store execution unit configured to access the first L1 data cache; and a second load/store execution unit configured to: access the second L1 data cache in a multi-thread mode, and in a single thread mode, access the first L1 data cache. The second L1 data cache is used as a victim cache for the first L1 data cache.

In further embodiments, the processing system can further include a first memory management unit (MMU) coupled between the first load/store execution unit and the first L1 data cache; a second MMU coupled between the second load/store execution unit and the second L1 data cache; and in the single thread mode, the first MMU and the second MMU include the same information.

In further embodiments, the processing system can move a cache line evicted from the first L1 cache to the victim cache by fetching a cache line with requested data from a Level 2 (L2) cache to the victim cache.

In further embodiments, the processing system can move a cache line from the victim cache to the L1 cache by fetching a cache line with requested data from a L2 cache to the victim cache.

In further embodiments, the processing system can write the requested data into only the victim cache in response to a cache store miss occurring for requested data in the first L1 data cache.

In further embodiments, the processing system can write the requested data into a L2 cache only in response to determining that a cache store miss for requested data occurred in the first L1 data cache and the victim cache.

In further embodiments, the processing system can write a cache line with the requested data from the victim cache to the L1 cache, and if the L1 cache evicts a cache line, write the cache line evicted from the L1 cache to the victim cache.

In further embodiments, the processing system can write requested data from a L2 cache to the L1 cache, evict a cache line from the L1 cache to the victim cache; and if a dirty cache line is evicted from the victim cache, swap the dirty cache line for the requested data between the victim cache and the L2 cache.

In further embodiments, the processing system can perform at least one of the group consisting of: write the requested data into the L1 data cache and a L2 cache, and write the requested data into the victim cache and the L2 cache, when a cache store miss for requested data occurs in the first L1 data cache.

In another embodiment, a microprocessor system includes a first data cache that is shared by a first group of two or more program threads in a multi-thread mode and used by one program thread in a single-thread mode; and a second data cache that is shared by a second group of two or more program threads in the multi-thread mode and used as a victim cache for the first data cache in the single-thread mode.

In further embodiments, the microprocessor system can include a first load/store execution unit configured to access the first data cache; and a second load/store execution unit configured to: access the second data cache in the multi-thread mode, and access the first data cache in the single thread mode.

In further embodiments, the microprocessor system can include more than one decoder units; a first set of execution queues; and a second set of execution queues. During the single-thread mode, the microprocessor system allows a single thread to use more than half of the decoder units and the first and second sets of execution queues. During the multi-thread mode, the microprocessor system allows at least one thread to use half of the decoder units and the first set of execution queues, and at least another thread to use the other half of the decoder units and the second set of execution queues.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   in a computer system executing multiple program threads in multi-thread mode in a processing unit:
      accessing a first Level 1 (L1) data cache for a first subset of the threads;
      accessing a second L1 data cache for a second subset of the threads;
   in the computer system executing a single program thread in single thread mode in the processing unit:
      configuring the second L1 data cache as a victim cache for the first L1 data cache upon switching to the single thread mode; and
      accessing the first L1 data cache and the victim cache for the single program thread;
   in the single thread mode, storing the same information in a first memory management unit (MMU) coupled between a first load/store execution unit and the first L1 data cache, and a second MMU coupled between a second load/store execution unit and the second L1 data cache.

2. The method of claim 1 wherein the first L1 data cache is a write-through cache, the method further comprising:
   evicting a cache line from the first L1 cache to the victim cache by fetching a cache line with requested data from a Level 2 (L2) cache to the victim cache.

3. The method of claim 1 wherein the first L1 data cache is a write-through cache, the method further comprising:
   moving a cache line from the victim cache to the L1 cache by fetching a cache line with requested data from a L2 cache to the victim cache.

4. The method of claim 1 further comprising:
   in response to determining that a cache store miss for requested data occurred in the first L1 data cache:
      writing the requested data into only the victim cache.

5. The method of claim 1 further comprising:
   in response to determining that a cache store miss for requested data occurred in the first L1 data cache and the victim cache:
      writing the requested data into a L2 cache only.

6. The method of claim 1 further comprising:
   the victim cache is powered-off to conserve power until a predetermined threshold for cache line eviction is met.

7. The method of claim 1 further comprising:
   writing requested data from a L2 cache to the L1 cache;
   evicting a cache line from the L1 cache to the victim cache; and
   if a dirty cache line is evicted from the victim cache, writing the dirty cache line to the L2 cache.

8. The method of claim 1 further comprising:
   upon determining that a cache store miss for requested data occurred in the first L1 data cache, performing at least one of the group consisting of: writing the requested data into the L1 data cache and a L2 cache, writing the requested data into the victim cache and the L2 cache, and writing the requested data to the L2 cache.

9. A processing system comprising:
   a first L1 data cache;
   a second L1 data cache;
   a first load/store execution unit configured to access the first L1 data cache; and
   a second load/store execution unit configured to:
      access the second L1 data cache in a multi-thread mode, and
      in a single thread mode, access the first L1 data cache, wherein the second L1 data cache is configured as a victim cache for the first L1 data cache upon switching to the single-thread mode;
   a first memory management unit (MMU) coupled between the first load/store execution unit and the first L1 data cache;
   a second MMU coupled between the second load/store execution unit and the second L1 data cache; and
   in the single thread mode, the first MMU and the second MMU include the same information.

10. The system of claim 9 further comprising:
    in the single-thread mode,
       a cache line evicted from the first L1 cache is moved to the victim cache by fetching a cache line with requested data from a Level 2 (L2) cache to the victim cache.

11. The system of claim 9 further comprising:
    in the single thread mode,
       a cache line is moved from the victim cache to the L1 cache by fetching a cache line with requested data from a L2 cache to the victim cache.

12. The system of claim 9 further comprising:
    in the single thread mode, the requested data is written into only the victim cache in response to a cache store miss occurring for requested data in the first L1 data cache.

13. The system of claim 9 further comprising:
    in the single thread mode, the requested data is written into a L2 cache only in response to determining that a cache store miss for requested data occurred in the first L1 data cache and the victim cache.

14. The system of claim 9 further comprising:
    the victim cache is powered-off to conserve power until a predetermined threshold for cache line eviction is met.

15. The system of claim 9 further comprising:
    in the single thread mode,
       requested data is written from a L2 cache to the L1 cache;
       a cache line is evicted from the L1 cache to the victim cache; and
       if a dirty cache line is evicted from the victim cache, the dirty cache line is written into the L2 cache.

16. The system of claim 9 further comprising:
    in the single thread mode, at least one of the group consisting of:
       the requested data is written into the L1 data cache and a L2 cache,
       the requested data is written into the victim cache and the L2 cache, and
       the requested data is written into the L2 cache,
    is performed for a cache store for the requested data.

17. A microprocessor system comprising:
    a first data cache that is shared by a first group of one or more program threads in a multi-thread mode and used by one program thread in a single-thread mode; and
    a second data cache that is shared by a second group of one or more program threads in the multi-thread mode and is configured as a victim cache for the first data cache upon switching to the single-thread mode;
    a first memory management unit (MMU) coupled between a first load/store execution unit and the first L1 data cache;
    a second MMU coupled between a second load/store execution unit and the second L1 data cache; and in the single thread mode, the first MMU and the second MMU include the same information.

18. The system of claim 17 further comprising:
the first load/store execution unit configured to access the first data cache; and
the second load/store execution unit configured to:
  access the second data cache in the multi-thread mode, and
  access the first data cache in the single thread mode.

19. The system of claim 17 further comprising:
more than one decoder units;
a first set of execution queues; and
a second set of execution queues;
wherein
  during the single-thread mode, the system is configured to allow a single thread to use more than half of the decoder units and the first and second sets of execution queues, and
  during the multi-thread mode, the system is configured to allow at least one thread to use half of the decoder units and the first set of execution queues, and at least another thread to use the other half of the decoder units and the second set of execution queues.

* * * * *